United States Patent
Jotwani

(10) Patent No.: US 11,948,380 B1
(45) Date of Patent: Apr. 2, 2024

(54) CAMERA PARAMETER ESTIMATION USING SEMANTIC LABELS

(71) Applicant: Apple Inc., Cupertino, CA (US)

(72) Inventor: Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 498 days.

(21) Appl. No.: 17/158,212

(22) Filed: Jan. 26, 2021

Related U.S. Application Data

(60) Provisional application No. 62/982,339, filed on Feb. 27, 2020.

(51) Int. Cl.
*G06V 30/262* (2022.01)
*G06F 18/24* (2023.01)
(Continued)

(52) U.S. Cl.
CPC ............ *G06V 30/274* (2022.01); *G06F 18/24* (2023.01); *G06T 7/10* (2017.01); *G06T 7/70* (2017.01);
(Continued)

(58) Field of Classification Search
CPC .................... G06V 30/274; G06T 7/80; G06T 2207/10028; G06F 18/24
See application file for complete search history.

(56) References Cited

U.S. PATENT DOCUMENTS 10,824,923 B1 * 11/2020 Forster .................. G06V 20/00
2010/0287485 A1 * 11/2010 Bertolami ............... G06F 3/011
715/764

(Continued)

*Primary Examiner* — Myron Wyche
(74) *Attorney, Agent, or Firm* — Fernando & Partners, LLP

(57) ABSTRACT

In one implementation, a method of determining an estimate of a position of a camera is performed at a device including one or more processors and non-transitory memory. The method includes obtaining a point cloud of a physical environment including a plurality of points, wherein each of the plurality of points is associated with set of three-dimensional coordinates in a three-dimensional coordinate system of the physical environment, wherein the plurality of points includes a first cluster of points associated with a first semantic label. The method includes obtaining a two-dimensional image of the physical environment associated with a point-of-view set of three-dimensional coordinates in the three-dimensional coordinate system of the physical environment. The method includes detecting, in the two-dimensional image of the physical environment, a representation of a first object corresponding to the first semantic label. The method includes determining a first plurality of sets of two-dimensional coordinates in a two-dimensional coordinate system of the two-dimensional image of the physical environment corresponding to the representation of the first object. The method includes determining, from the first cluster of points associated with the first semantic label, a first plurality of sets of three-dimensional coordinates in the three-dimensional coordinate system of the physical environment respectively corresponding to the first plurality of sets of two-dimensional coordinates in the two-dimensional coordinate system of the two-dimensional image of the physical environment. The method includes determining an estimate of the point-of-view set of three-dimensional coordinates based on the first plurality of two-dimensional coordinates and the first plurality of three-dimensional coordinates.

24 Claims, 10 Drawing Sheets

(51) Int. Cl.
*G06T 7/10* (2017.01)
*G06T 7/70* (2017.01)
*G06T 7/80* (2017.01)

(52) U.S. Cl.
CPC ...... *G06T 7/80* (2017.01); *G06T 2207/10028* (2013.01)

(56) References Cited

U.S. PATENT DOCUMENTS

| | | | |
|---|---|---|---|
| 2012/0038637 A1* | 2/2012 | Marks | A63F 13/213 345/419 |
| 2016/0253824 A1* | 9/2016 | Yu | H04N 23/60 348/46 |
| 2019/0271551 A1* | 9/2019 | Stess | G01S 7/4808 |
| 2019/0385339 A1* | 12/2019 | Zhao | G06T 7/80 |
| 2020/0018852 A1* | 1/2020 | Walls | G01S 7/4972 |

* cited by examiner

| | 520 | 530 | 540 |
|---|---|---|---|
| 1 | (X1, Y1, Z1) | A | table |
| 2 | (X2, Y2, Z2) | A | table |
| 3 | (X3, Y3, Z3) | A | table |
| 4 | (X4, Y4, Z4) | B | floor |
| 5 | (X5, Y5, Z5) | B | floor |
| 6 | (X6, Y6, Z6) | A | table |
| 7 | (X7, Y7, Z7) | C | cylinder |
| 8 | (X8, Y8, Z8) | C | cylinder |
| 9 | (X9, Y9, Z9) | B | floor |

┌─────────────────────────────────────────────────────────┐
│ Obtaining a point cloud of a physical environment including a │
│ plurality of points, wherein each of the plurality of points is │ — 810
│ associated with a set of three-dimensional coordinates in a three- │
│ dimensional coordinate system of the physical environment, wherein │
│ the plurality of points includes a first cluster of points associated with │
│ a first semantic label │
└─────────────────────────────────────────────────────────┘
                              ↓
┌─────────────────────────────────────────────────────────┐
│ Obtaining a two-dimensional image of the physical environment with │
│ a camera associated with one or more intrinsic parameters of the │ — 820
│ camera │
└─────────────────────────────────────────────────────────┘
                              ↓
┌─────────────────────────────────────────────────────────┐
│ Detecting, in the two-dimensional image of the physical │
│ environment, a representation of a first object corresponding to the │ — 830
│ first semantic label │
└─────────────────────────────────────────────────────────┘
                              ↓
┌─────────────────────────────────────────────────────────┐
│ Determining a first plurality of sets of two-dimensional coordinates in │
│ a two-dimensional coordinate system of the two-dimensional image │ — 840
│ of the physical environment corresponding to the representation of │
│ the first object │
└─────────────────────────────────────────────────────────┘
                              ↓
┌─────────────────────────────────────────────────────────┐
│ Determining, from the first cluster of points associated with the first │
│ semantic label, a first plurality of sets of three-dimensional │
│ coordinates in the three-dimensional coordinate system of the │ — 850
│ physical environment respectively corresponding to the first plurality │
│ of sets of two-dimensional coordinates in the two-dimensional │
│ coordinate system of the two-dimensional image of the physical │
│ environment │
└─────────────────────────────────────────────────────────┘
                              ↓
┌─────────────────────────────────────────────────────────┐
│ Determining an estimate of the one or more intrinsic parameters of │ — 860
│ the camera based on the first plurality of two-dimensional │
│ coordinates and the first plurality of three-dimensional coordinates │
└─────────────────────────────────────────────────────────┘

┌─────────────────────────────────────────────────────────────┐
│ Obtaining a point cloud of a physical environment including a │
│ plurality of points, wherein each of the plurality of points is │ ─ 910
│ associated with a set of three-dimensional coordinates in a three- │
│ dimensional coordinate system of the physical environment, wherein │
│ the plurality of points includes a first cluster of points associated with │
│ a first semantic label │
└─────────────────────────────────────────────────────────────┘
                                 ↓
┌─────────────────────────────────────────────────────────────┐
│ Obtaining a two-dimensional image of the physical environment │
│ associated with a point-of-view set of three-dimensional coordinates │ ─ 920
│ in the three-dimensional coordinate system of the physical │
│ environment │
└─────────────────────────────────────────────────────────────┘
                                 ↓
┌─────────────────────────────────────────────────────────────┐
│ Detecting, in the two-dimensional image of the physical │
│ environment, a representation of a first object corresponding to the │ ─ 930
│ first semantic label │
└─────────────────────────────────────────────────────────────┘
                                 ↓
┌─────────────────────────────────────────────────────────────┐
│ Determining a first plurality of sets of two-dimensional coordinates in │
│ a two-dimensional coordinate system of the two-dimensional image │ ─ 940
│ of the physical environment corresponding to the representation of │
│ the first object │
└─────────────────────────────────────────────────────────────┘
                                 ↓
┌─────────────────────────────────────────────────────────────┐
│ Determining, from the first cluster of points associated with the first │
│ semantic label, a first plurality of sets of three-dimensional │
│ coordinates in the three-dimensional coordinate system of the │ ─ 950
│ physical environment respectively corresponding to the first plurality │
│ of sets of two-dimensional coordinates in the two-dimensional │
│ coordinate system of the two-dimensional image of the physical │
│ environment │
└─────────────────────────────────────────────────────────────┘
                                 ↓
┌─────────────────────────────────────────────────────────────┐
│ Determining an estimate of the point-of-view set of three- │
│ dimensional coordinates based on the first plurality of two- │ ─ 960
│ dimensional coordinates and the first plurality of three-dimensional │
│ coordinates │
└─────────────────────────────────────────────────────────────┘

Figure 9

CAMERA PARAMETER ESTIMATION USING SEMANTIC LABELS

CROSS-REFERENCE TO RELATED APPLICATIONS

This application claims priority to U.S. Provisional Patent App. No. 62/982,339, filed on Feb. 27, 2020, and hereby incorporated by reference herein in its entirety.

TECHNICAL FIELD

The present disclosure generally relates to camera parameter estimation and, in particular, to systems, methods, and devices for estimating camera parameters using semantically labeled point clouds.

BACKGROUND

A point cloud includes a set of points in a three-dimensional space. In various implementations, each point in the point cloud corresponds to a surface of an object in a physical environment. Point clouds can be used to represent a physical environment in various computer vision and/or extended reality (XR) applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 illustrates a point cloud data object in accordance with some implementations.

FIG. 8 is a flowchart representation of a method of determining an estimate of one or more intrinsic parameters of a camera in accordance with some implementations.

FIG. 9 is a flowchart representation of a method of determining an estimate of a position of a camera in accordance with some implementations.

Figure 1:
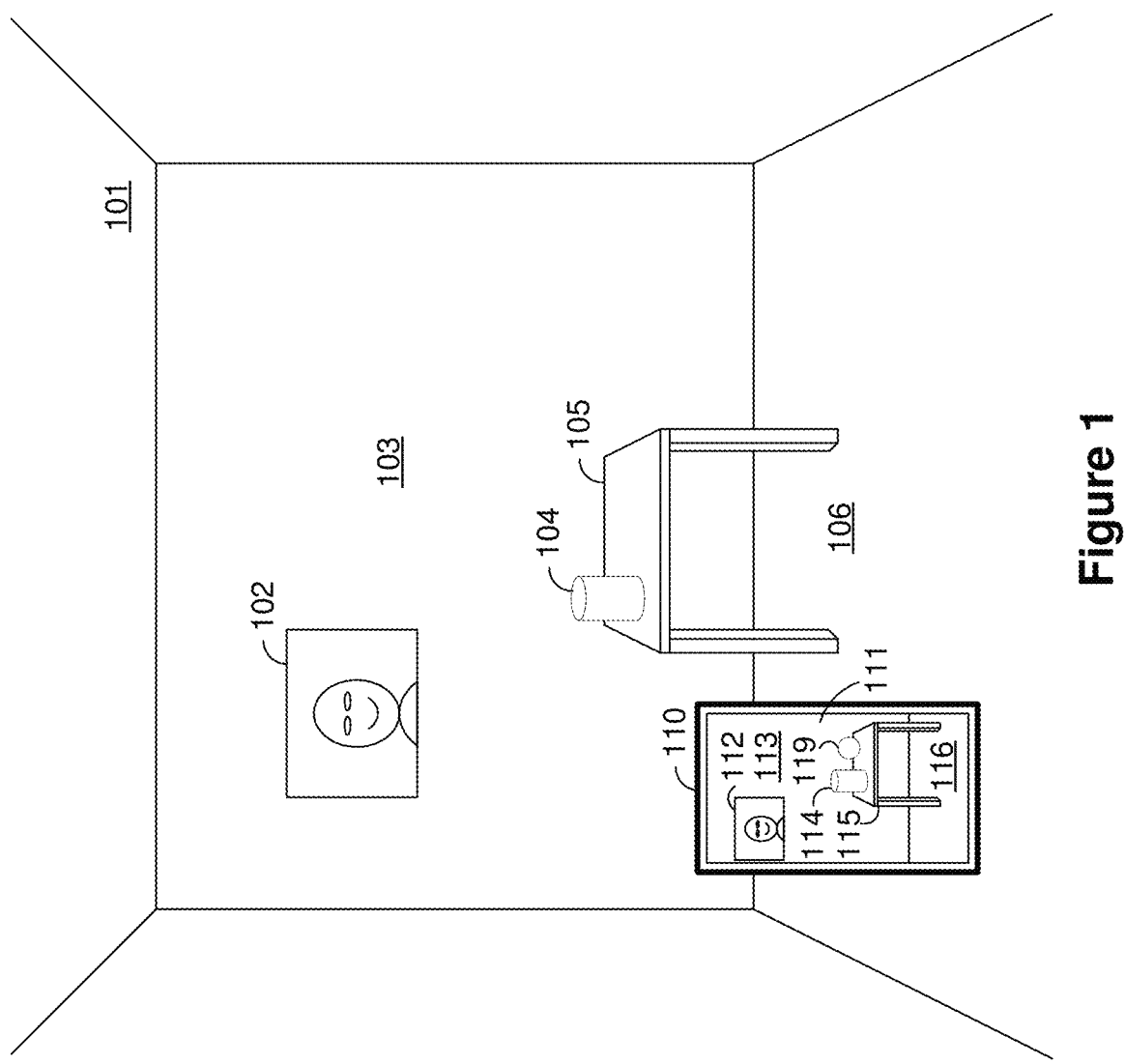
FIG. 1 illustrates a physical environment with a handheld electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining an estimate of one or more intrinsic parameters of a camera. In various implementations, a method is performed at a device including one or more processors and non-transitory memory. The method includes obtaining a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label. The method includes obtaining a two-dimensional image of the physical environment with a camera associated with one or more intrinsic parameters of the camera. The method includes detecting, in the two-dimensional image of the physical environment, a representation of a first object corresponding to the first semantic label. The method includes determining a plurality of sets of two-dimensional coordinates in a two-dimensional coordinate system of the two-dimensional image of the physical environment corresponding to the representation of the first object. The method includes determining, from the first cluster of points associated with the first semantic label, a plurality of sets of three-dimensional coordinates in the three-dimensional coordinate system of the physical environment respectively corresponding to the plurality of sets of two-dimensional coordinates in the two-dimensional coordinate system of the two-dimensional image of the physical environment. The method includes determining an estimate of the one or more intrinsic parameters of the camera based on the plurality of two-dimensional coordinates and the plurality of three-dimensional coordinates.

Various implementations disclosed herein include devices, systems, and methods for determining an estimate of a position of a camera. In various implementations, a method is performed at a device including one or more processors and non-transitory memory. The method includes obtaining a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label. The method includes obtaining a two-dimensional image of the physical environment associated with a point-of-view set of three-dimensional coordinates in the three-dimensional coordinate system of the physical environment. The method includes detecting, in the two-dimensional image of the physical environment, a representation of a first object corresponding to the first semantic label. The method includes determining a first plurality of sets of two-dimensional coordinates in a two-dimensional coordinate system of the two-dimensional image of the physical environment corresponding to the representation of the first object. The method includes determining, from the first cluster of points associated with the first semantic label, a first plurality of sets of three-dimensional coordinates in the three-dimensional coordinate system of the physical environment respectively corresponding to the first plurality of sets of two-dimensional coordinates in the two-dimensional coordinate system of the two-dimensional image of the physical environment. The method includes determining an estimate of the point-of-view set of three-dimensional coordinates based on the first plurality of two-dimensional coordinates and the first plurality of three-dimensional coordinates.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment is represented by a point cloud. The point cloud includes a plurality of points, each of the plurality of points associated with at least a set of coordinates in the three-dimensional space and corresponding to a surface of an object in a physical environment. In various implementations, each of the plurality of points is further associated with other data representative of the surface of the object in the physical environment, such as RGB data representative of the color of the surface of the object. In various implementations, at least one of the plurality of points is further associated with a semantic label that represents an object type or identity of the surface of the object. For example, the semantic label may be "tabletop" or "table" or "wall".

Estimating camera parameters based on a two-dimensional image, such as estimating the camera pose or the camera focal length, can be a difficult process. However, such parameters can be estimated with knowledge of a plurality of points in the two-dimensional image and their corresponding three-dimensional coordinates in a three-dimensional space. Determining this correspondence is simplified using semantic labels.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with a handheld electronic device 110 surveying the physical environment 101. The physical environment 101 includes a picture 102 hanging on a wall 103, a table 105 on the floor 106, and a cylinder 104 on the table 105.

The handheld electronic device 110 displays, on a display, a representation of the physical environment 111 including a representation of the picture 112 hanging on a representation of the wall 113, a representation of the table 115 on a representation of the floor 116, and a representation of the cylinder 114 on the representation of the table 115. In various implementations, the representation of the physical environment 111 is generated based on an image of the physical environment captured with a scene camera of the handheld electronic device 110 having a field-of-view directed toward the physical environment 101.

In addition to the representations of real objects of the physical environment 101, the representation of the physical environment 111 includes a virtual object 119 displayed on the representation of the table 115.

In various implementations, the handheld electronic device 110 includes a single scene camera (or single rear-facing camera disposed on an opposite side of the handheld electronic device 110 as the display). In various implementations, the handheld electronic device 110 includes at least two scene cameras (or at least two rear-facing cameras disposed on an opposite side of the handheld electronic device 110 as the display).

Figure 2B:
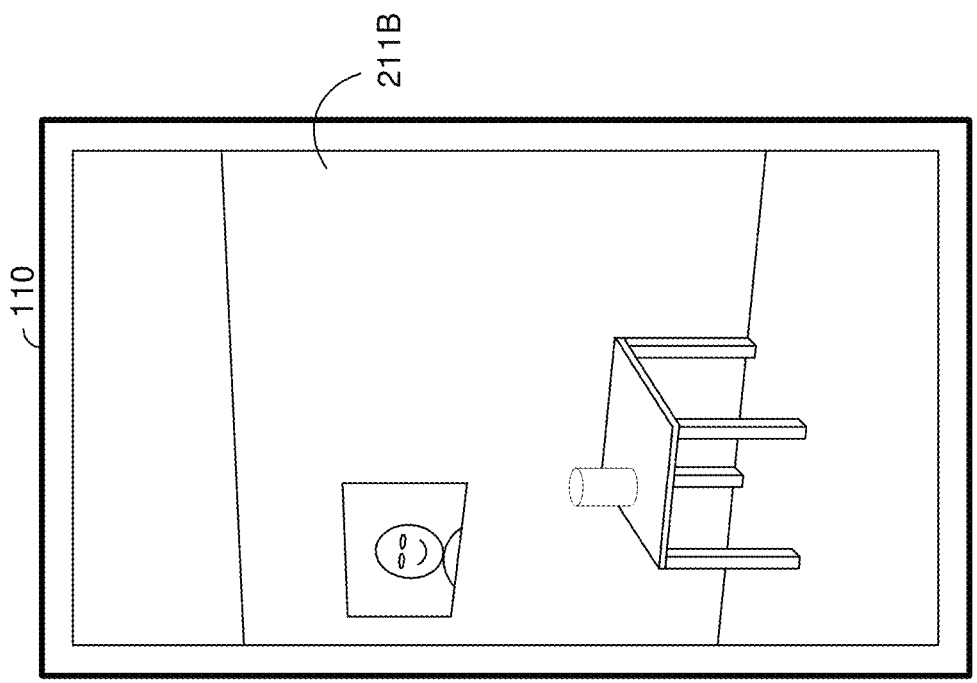
FIGS. 2A and 2B illustrate the handheld electronic device of FIG. 1 displaying two images of the physical environment captured from different perspectives.
Figure 2A:
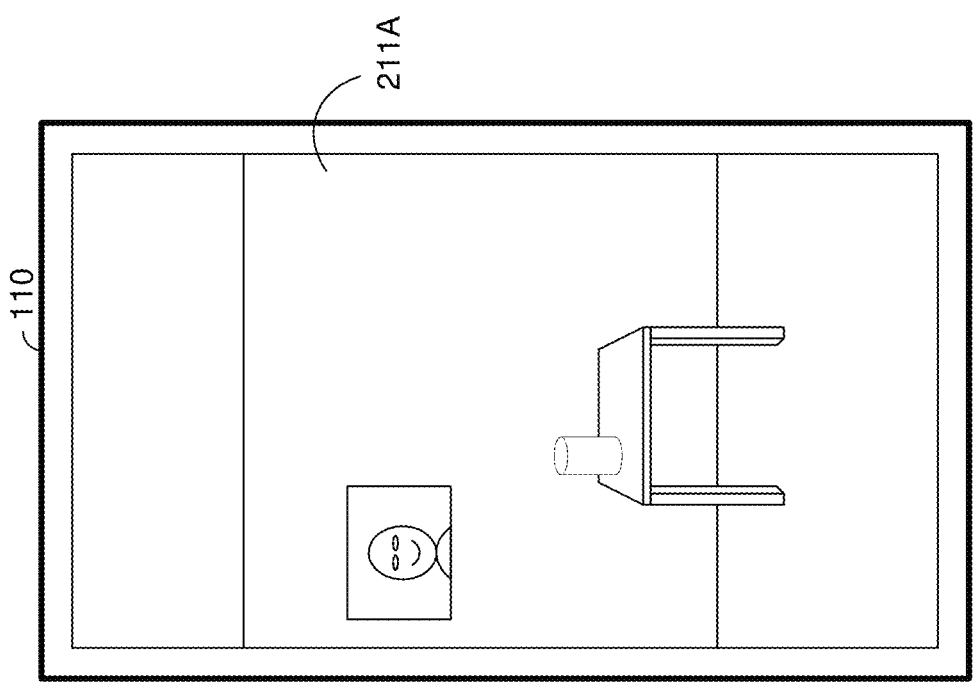

FIG. 2A illustrates the handheld electronic device 110 displaying a first image 211A of the physical environment 101 captured from a first perspective. FIG. 2B illustrates the handheld electronic device 110 displaying a second image 211B of the physical environment 101 captured from a second perspective different from the first perspective.

In various implementations, the first image 211A and the second image 211B are captured by the same camera at different times (e.g., by the same single scene camera at two different times when the handheld electronic device 110 is moved between the two different times). In various implementations, the first image 211A and the second image 211B are captured by different cameras at the same time (e.g., by two scene cameras).

Using a plurality of images of the physical environment 101 captured from a plurality of different perspectives, such as the first image 211A and the second image 211B, the handheld electronic device 110 generates a point cloud of the physical environment 101.

Figure 3B:
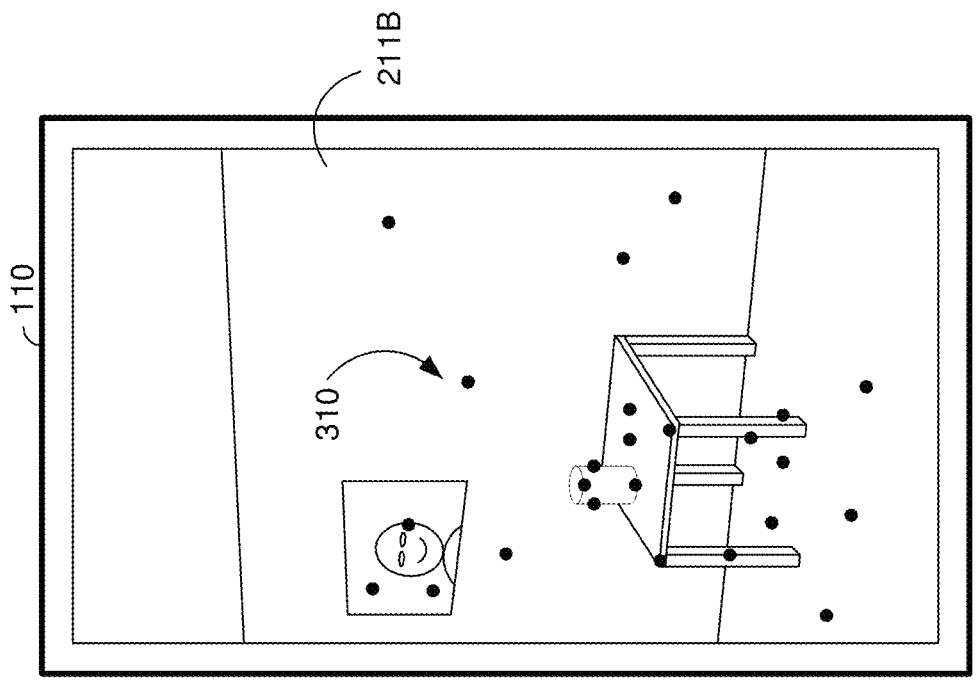
FIGS. 3A and 3B illustrate the handheld electronic device of FIG. 1 displaying the two images overlaid with a representation of a point cloud.
Figure 3A:
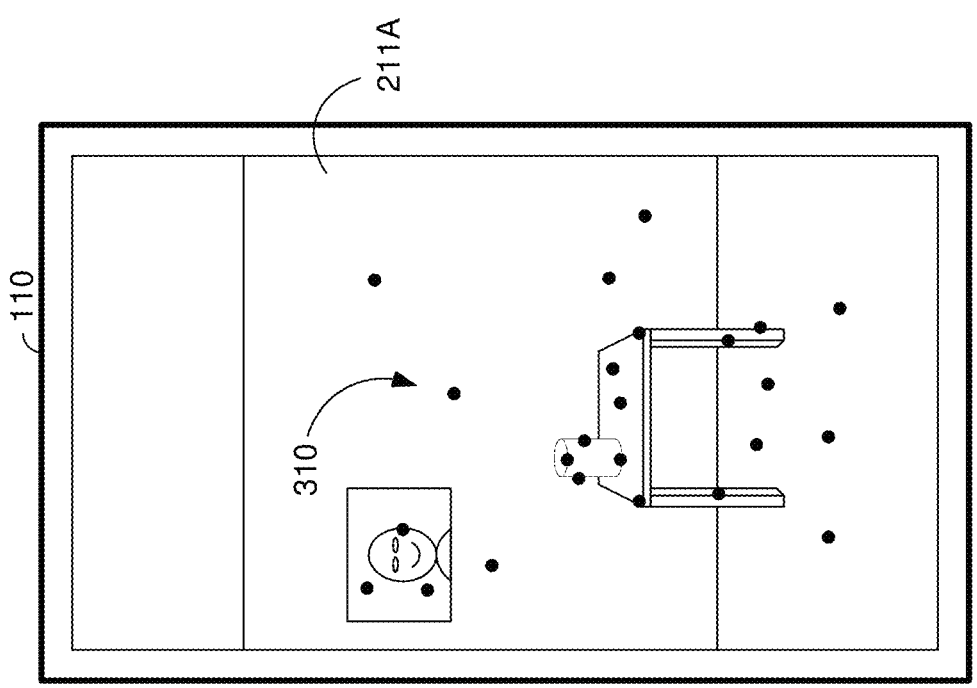

FIG. 3A illustrates the handheld electronic device 110 displaying the first image 211A overlaid with a representation of the point cloud 310. FIG. 3B illustrates the handheld electronic device 110 displaying the second image 211B overlaid with the representation of the point cloud 310.

The point cloud includes a plurality of points, wherein each of the plurality of points is associated with a set of coordinates in a three-dimensional space. For example, in various implementations, each point is associated with an x-coordinate, a y-coordinate, and a z-coordinate. In various implementations, each point in the point cloud corresponds to a feature in the physical environment 101, such as a surface of an object in the physical environment 101.

The handheld electronic device 110 spatially disambiguates the point cloud into a plurality of clusters. Accordingly, each of the clusters includes a subset of the points of the point cloud 310.

Figure 4B:
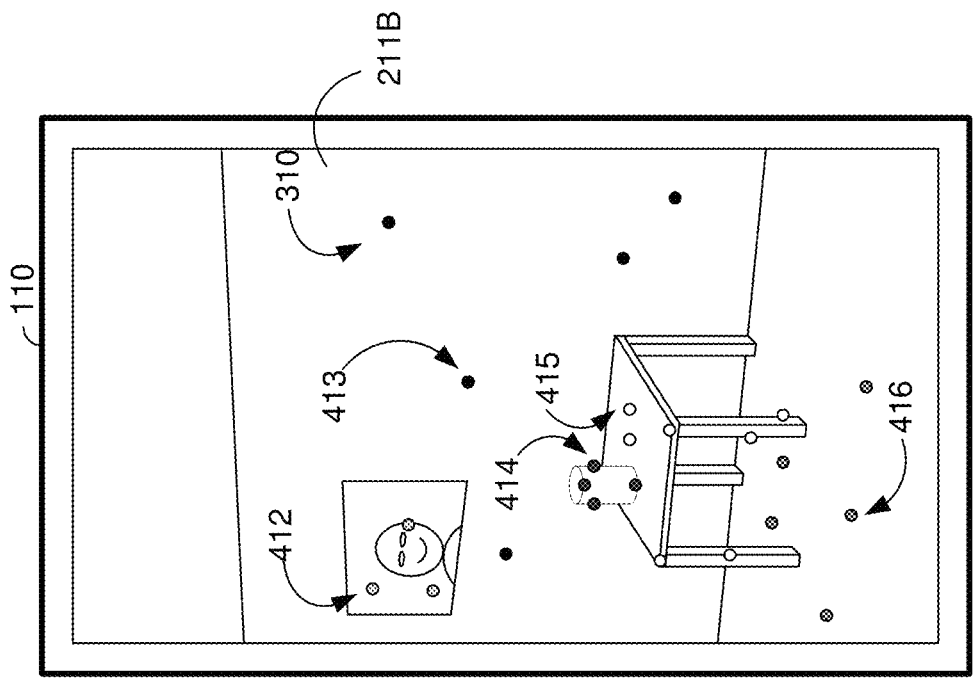
FIGS. 4A and 4B illustrate the handheld electronic device of FIG. 1 displaying the two images overlaid with a representation of the point cloud spatially disambiguated into a plurality of clusters.
Figure 4A:
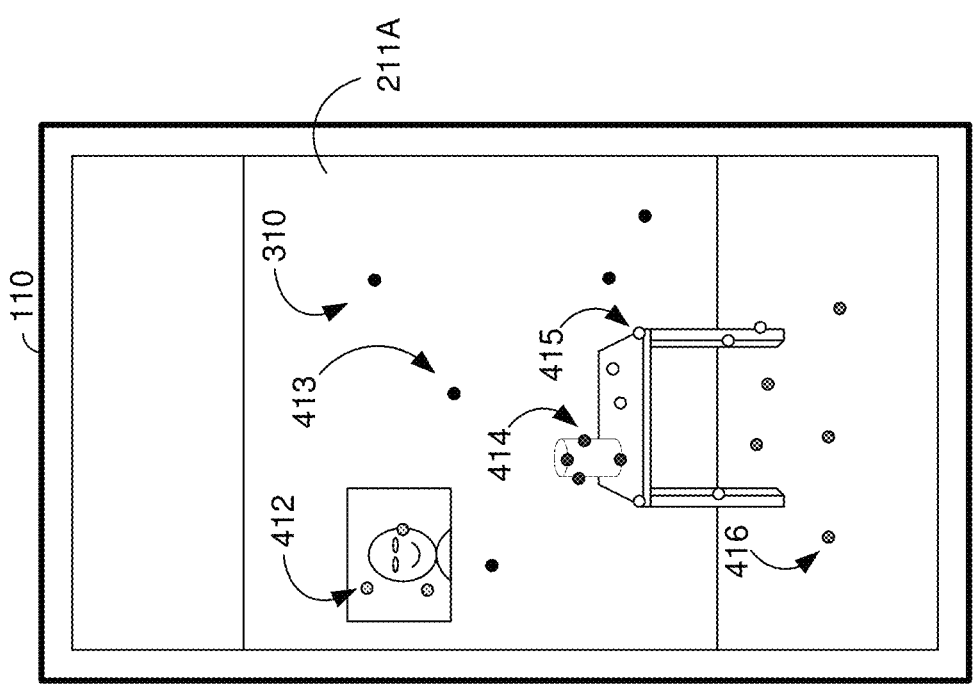

FIG. 4A illustrates the handheld electronic device 110 displaying the first image 211A overlaid with the representation of the point cloud 310 spatially disambiguated into a plurality of clusters 412-416. FIG. 4B illustrates the handheld electronic device 110 displaying the second image 211B overlaid with the representation of the point cloud 310 spatially disambiguated into the plurality of clusters 412-416. The representation of the point cloud 310 includes a first cluster 412 (shown in light gray), a second cluster 413 (shown in black), a third cluster 414 (shown in dark gray), a fourth cluster 415 (shown in white), and a fifth cluster 416 (shown in medium gray).

In various implementations, each of the plurality of clusters is assigned a unique cluster identifier. For example, the clusters may be assigned numbers, letters, or other unique labels.

For each cluster, the handheld electronic device 110 determines a semantic label. In various implementations, each cluster corresponds to an object in the physical environment. For example, in FIG. 4A and FIG. 4B, the first cluster 412 corresponds to the picture 102, the second cluster 413 corresponds to the wall 413, the third cluster 414 corresponds to the cylinder 104, the fourth cluster 415 corresponds to the table 105, and the fifth cluster 416 corresponds to the floor 106. In various implementations, the semantic label indicates an object type or identity of the object.

In various implementations, the handheld electronic device 110 stores the semantic label in association with each point of the cluster. FIG. 5 illustrates a point cloud data object 500 in accordance with some implementations. The point cloud data object 500 includes a plurality of data elements (shown as rows in FIG. 5), wherein each data element is associated with a particular point of a point cloud. The data element for a particular point includes a point identifier field 510 that includes a point identifier of a particular point. As an example, the point identifier may be a unique number. The data element for the particular point includes a coordinate field 520 that includes a set of coordinates in a three-dimensional space of the particular point. The data element for the particular point includes a cluster identifier field 530 that includes an identifier of the cluster into which the particular point is spatially disambiguated. As an example, the cluster identifier may be a letter or number. The data element for the particular point includes a semantic label field 540 that includes a semantic label for the cluster into which the particular point is spatially disambiguated.

The semantic labels may be stored in association with the point cloud in other ways. For example, the point cloud may be stored as a set of cluster objects, each cluster object including a cluster identifier for a particular cluster, a semantic label of the particular cluster, and a plurality of sets of coordinates corresponding to the plurality of points spatially disambiguated into the particular cluster.

The handheld electronic device 110 can use the semantic labels in a variety of ways. For example, in various implementations, the handheld electronic device 110 can display a virtual object, such as a virtual ball, on the top of a cluster labeled as a "table", but not on the top of a cluster labeled as a "floor". In various implementations, the handheld electronic device 110 can display a virtual object, such as a virtual painting, over a cluster labeled as a "picture", but not over a cluster labeled as a "television".

Figure 6:
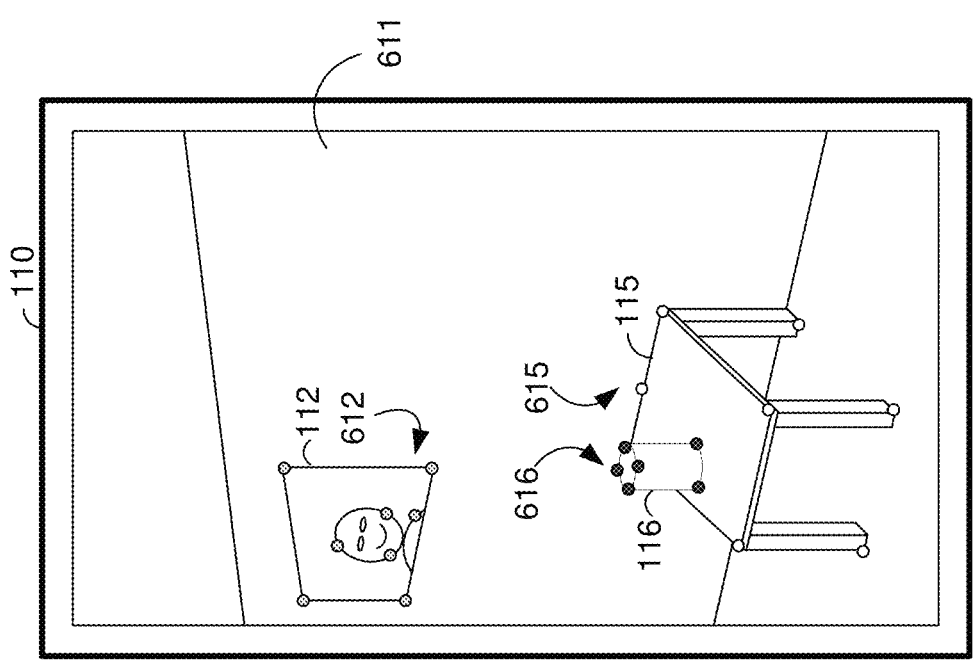
FIG. 6 illustrates the handheld electronic device of FIG. 1 displaying a third image of the physical environment captured from a third perspective.

FIG. 6 illustrates the handheld electronic device 110 displaying a third image 611 of the physical environment 101 captured from a third perspective. Using the point cloud, the handheld electronic device 110 determines the third perspective and/or intrinsic parameters of the camera of the handheld electronic device 110.

The handheld electronic device 110 performs object detection on the two-dimensional third image 611 to determine a plurality of sets of two-dimensional coordinates (in the two-dimensional space of the third image 611) of various objects. For example, the handheld electronic device 110 detects the representation of the picture 112 in the third image 611 and determines a plurality of sets of two-dimensional coordinates of the picture 612. The handheld electronic device 110 detects the representation of the table 115 in the third image 611 and determines a plurality of sets of two-dimensional coordinates of the table 615. The handheld electronic device 110 detects the representation of the cylinder 116 in the third image 611 and determines a plurality of sets of two-dimensional coordinates of the cylinder 616.

For a plurality of sets of two-dimensional coordinates in the two-dimensional space of the third image 611, the handheld electronic device 110 determines the corresponding sets of three-dimensional coordinates in the three-dimensional space of the physical environment 101 using the semantically labeled point cloud. For example, for a set of two-dimensional coordinates of the representation of the table 115 in the two-dimensional space of the third image 611 found by detecting a "table" in the third image 611, the handheld electronic device 110 determines the corresponding set of three-dimensional coordinates of the table 105 in the three-dimensional space of the physical environment 101 using the points of the point cloud cluster semantically labeled as "table". As another example, the handheld electronic device 110 determines the sets of two-dimensional coordinates of the representation of the picture 112 corresponding to the corners of the picture 102 using two-dimensional object detection techniques. The handheld electronic device 110 determines the corresponding sets of three-dimensional coordinates using the points of the point cloud cluster semantically labeled as "picture".

With a plurality of sets of two-dimensional coordinates and the corresponding sets of three-dimensional coordinates, the handheld electronic device 110 determines the extrinsic parameters of the camera (e.g., the pose) and/or the intrinsic parameters of the camera (e.g., the focal length, the shape and size of the image sensor, and/or the principal point) using one or more of various techniques, such as direct linear transformation (DLT).

The semantically labeled point cloud forms a three-dimensional scene model of the physical environment. In various implementations, the three-dimensional scene model includes one or more semantically labeled object models corresponding to one or more semantically labeled clusters of the point cloud. In various implementations, a semantically labeled object model includes a mesh-based model with a plurality of vertices (corresponding to the plurality of points in the cluster). In various implementations, the mesh-based model includes one or more edges between vertices, one or more faces surrounded by edges, and/or one or more textures associated with the faces.

Figure 7:
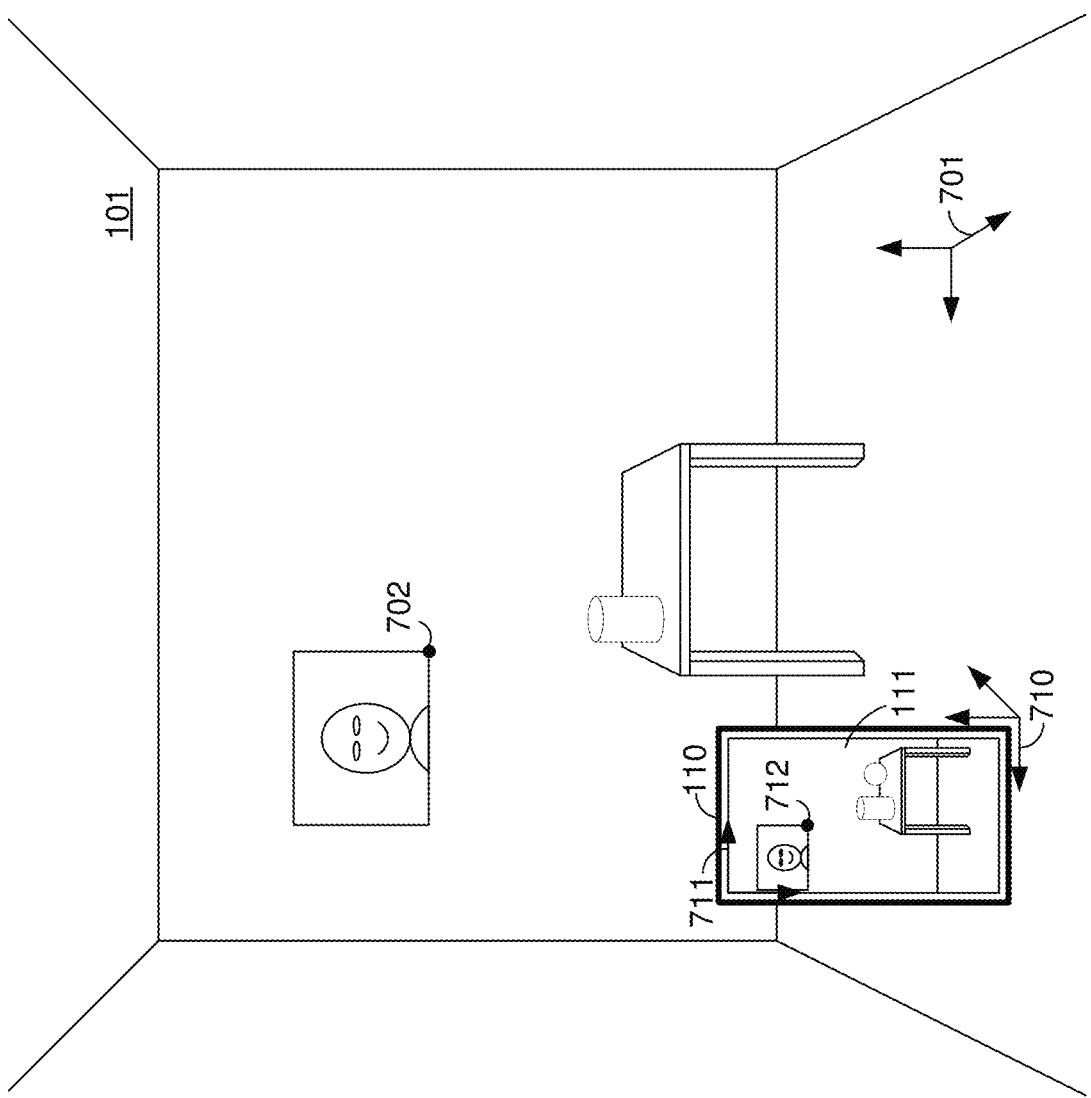
FIG. 7 illustrates the physical environment of FIG. 1 with a number of axes of different coordinate systems.

FIG. 7 illustrates the physical environment 101 with a number of axes of different coordinate systems. FIG. 7 further illustrates the handheld electronic device 110 surveying the physical environment 101 and displaying a two-dimensional image including a representation of the physical environment 111. FIG. 7 illustrates a first set of axes 701 representing the three-dimensional coordinate system of the physical environment 101. FIG. 7 illustrates a second set of axes 710 representing the three-dimensional coordinate system of the camera of the handheld electronic device 110. FIG. 7 illustrates a third set of axes 711 representing the two-dimensional coordinate system of the two-dimensional image including the representation of the physical environment 111.

A point 702 in the three-dimensional coordinate system of the physical environment having a set of three-dimensional coordinates of $(x_w, y_w, z_w)$ is related to a corresponding point 712 in the two-dimensional coordinate system of the image having a set of two-dimensional coordinates (u, v) by the following pinhole camera model equation:

$$k \begin{bmatrix} u \\ v \\ 1 \end{bmatrix} = C[R \quad T] \begin{bmatrix} x_w \\ y_w \\ z_w \\ 1 \end{bmatrix}.$$

k is a scaling parameter. C is a camera matrix. R is the rotation matrix between the three-dimensional coordinate system of the physical environment and the three-dimensional coordinate system of the camera. T is the translation matrix between the three-dimensional coordinate system of the physical environment and the three-dimensional coordinate system of camera.

The camera matrix, C, includes intrinsic parameters of the camera as follows:

$$C = \begin{bmatrix} \alpha_u & \gamma & u_o & 0 \\ 0 & \alpha_v & v_o & 0 \\ 0 & 0 & 1 & 0 \end{bmatrix}.$$

The parameters $\alpha_u = f \cdot m_u$ and $\alpha_v = f \cdot m_v$ represent focal length in terms of pixels, where $m_u$ and $m_v$ are the scale factors relating pixels to distance and f is the focal length in terms of distance. $\gamma$ is the skew coefficient between the u and v axes and is often 0 or presumed to be 0. $u_0$ and $v_0$ represent the principal point which would, ideally, be the center of the image. The aspect ratio is $\alpha_u/\alpha_v$.

R and T are the extrinsic parameters of the camera which denote the coordinate system transformations from the three-dimensional coordinate system of the physical environment to the three-dimensional coordinate system of the camera. Similarly, the extrinsic parameters define the position of the camera center and the camera's heading in the three-dimensional coordinate system of the physical environment. T is the position of the origin of the three-dimensional coordinate system of the physical environment expressed in coordinates of the three-dimensional coordinate system of the camera. The position, P, of the camera in the three-dimensional coordinate system of the physical environment is $-R^{-1}T$ or $-R^T T$.

When the camera matrix, C, is known, the camera is referred to as calibrated. In various implementations, the camera is calibrated, and the handheld electronic device 110 determines the extrinsic parameters using a plurality of points in the two-dimensional coordinate system of the image and the corresponding points in the three-dimensional coordinate system of the physical environment. For example, in various implementations, the handheld electronic device 110 uses a perspective-n-point algorithm. In various implementations, the extrinsic parameters of the camera are known and the handheld electronic device 110 determines the intrinsic parameters of the camera using a plurality of points in the two-dimensional coordinate system of the image and the corresponding points in the three-dimensional coordinate system of the physical environment. For example, the handheld electronic device 110 calibrates the camera. In various implementations, neither the intrinsic parameters nor the extrinsic parameters of the camera are known and the handheld electronic device 110 determines both the intrinsic parameters of the camera and the extrinsic parameters of the camera using a plurality of points in the two-dimensional coordinate system of the image and the corresponding points in the three-dimensional coordinate system of the physical environment. For example, the handheld electronic device uses a direct linear transform (DLT) method, Zhang's method, or Tsai's method.

FIG. 8 is a flowchart representation of a method 800 of determining an estimate of one or more intrinsic parameters of a camera in accordance with some implementations. In various implementations, the method 800 is performed by a device with one or more processors and non-transitory memory. In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device obtaining a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label.

In various implementations, obtaining the point cloud includes obtaining a plurality of images of the physical environment from a plurality of different perspectives and generating the point cloud based on the plurality of images of the physical environment. For example, in various implementations, the device detects the same feature in two or more images of the physical environment and using perspective transform geometry, determines the sets of coordinates in the three-dimensional space of the feature. In various implementations, the plurality of images is captured by the same camera at different times (e.g., by the same single scene camera of the device at different times when the device is moved between the times). In various implementations, the plurality of images is captured by different cameras of the device at the same time (e.g., by multiple scene cameras).

In various implementations, obtaining the point cloud includes obtaining an image of a physical environment, obtaining a depth map of the image of the physical environment, and generating the point cloud based on the image of the physical environment and the depth map. In various implementations, the image is captured by a scene camera of the device and the depth map is generated by a depth sensor of the device.

In various implementations, obtaining the point cloud includes using a 3D scanner to generate the point cloud.

In various implementations, each point is associated with additional data. In various implementations, each point is associated with a color. In various implementations, each point is associated with a color-variation indicating how the point changes color over time. As an example, such information may be useful in discriminating between a semantic label of a "picture" or a "television". In various implementations, each point is associated with a confidence indicating a probability that the coordinates in the three-dimensional space of the point is the true location of the corresponding surface of the object in the physical environment.

In various implementations, obtaining the point cloud of the physical environment includes spatially disambiguating portions of the plurality of points into a plurality of clusters including the first cluster of points. Each cluster includes a subset of the plurality of points of the point cloud. In various implementations, particular points of the plurality of points (e.g., those designated as noise) are not included in any of the plurality of clusters.

Various point cloud clustering algorithms can be used to spatially disambiguate the point cloud. In various implementations, spatially disambiguating portions of the plurality of points into the plurality of clusters includes performing plane model segmentation. Accordingly, certain clusters of the plurality of clusters correspond to sets of points of the point cloud that lie in the same plane. In various implementations, spatially disambiguating portions of the plurality of points into the plurality of clusters includes performing Euclidean cluster extraction.

In various implementations, obtaining the point cloud of the physical environment includes determining the first semantic label based on the volumetric arrangement of the points of the first cluster of points. In various implementations, the device determines a semantic label for each of the plurality of clusters.

In various implementations, the device determines the first semantic label by determining a flatness of the first cluster of points. For example, if a bounding box surrounding the first cluster of points has a depth in a dimension that is substantially smaller than its height and width, the cluster is "flat." If the flat cluster is vertical, the device determines a semantic label of "wall". If the flat cluster is horizontal, the device determines a semantic label of "tabletop", but it the cluster is the lowest such horizontal cluster, the device determines a semantic label of "floor".

In various implementations, the device determines the first semantic label with a neural network. In particular, the device applies a neural network to the sets of coordinates in the three-dimensional space of the points of the first cluster to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the particular cluster. In various implementations, the neural network provides, as an output, a semantic label for the cluster.

As noted above, in various implementations, each point is associated with additional data. In various implementations, the additional data is also provided as an input to the neural network. For example, in various implementations, the color or color variation of each point of the cluster is provided to the neural network. In various implementations, the confidence of each point of the cluster is provided to the neural network.

In various implementations, the neural network is trained for a variety of object types. For each object type, training data in the form of point clouds of objects of the object type is provided. More particularly, training data in the form of the sets of coordinates in the three-dimensional space of the points of the point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular cluster corresponds to the particular object type in response to receiving the sets of coordinates in the three-dimensional space of the points of the particular cluster. Thus, in response to receiving the sets of coordinates in the three-dimensional space of the points of a particular cluster, a neural network detector for tables may output a 0.9, a neural network detector for chairs may output a 0.5, and a neural network detector for cylinders may output a 0.2. The semantic label is determined based on the greatest output.

In various implementations, the device determines multiple semantic labels for the particular cluster. In various implementations, the device determines a series of hierarchical or layered semantic labels for the particular cluster. For example, the device determines a number of semantic labels that identify the object represented by the cluster with increasing degrees of specificity. For example, the device determines a first semantic label of "flat" for the particular cluster indicating that the cluster has one dimension substantially smaller than the other two. The device then determines a second semantic label of "horizontal" indicating that the flat cluster is horizontal, e.g., like a floor or tabletop rather than vertical like a wall or picture. The device then determines a third semantic label of "floor" indicating that that the flat, horizontal cluster is a floor rather than a table or ceiling. The device then determines a fourth semantic label of "carpet" indicating that the floor is carpeted rather than tile or hardwood floor.

In various implementations, the device determines sub-labels associated with sub-clusters of the particular cluster. In various implementations, the method includes spatially disambiguating portions of the particular cluster into a plurality of sub-clusters and determining a semantic sub-label based on the volumetric arrangement of the points of a particular sub-cluster of the plurality of clusters. For example, in various implementations, the device determines a first semantic label of "table" for the particular cluster. After spatially disambiguating the table cluster include a plurality of sub-clusters, a first semantic sub-label of "tabletop" is determined for a first sub-cluster, whereas a second semantic sub-label of "leg" is determined for a second sub-cluster.

The method 800 continues, in block 820, with the device obtaining a two-dimensional image of the physical environment with a camera associated with one or more intrinsic camera parameters. In various implementations, the two-dimensional image of the physical environment is an image used in generating the point cloud. Accordingly, in various implementations, the position and/or orientation of the camera in the three-dimensional coordinate system of the physical environment is known for the two-dimensional image of the physical environment. For example, in generating the point cloud, the camera position and orientation when the two-dimensional image of the physical environment was captured can be designated as the origin without rotation and the sets of three-dimensional coordinates of the points of the point cloud can be determined with respect to that position and rotation.

Thus, in various implementations, one or more or all of the extrinsic parameters of the camera are known for the two-dimensional image of the physical environment. In various implementations, the device includes an IMU (inertial measurement unit) that provides one or more or all of the extrinsic parameters of the physical environment.

The method 800 continues, in block 830, with the device detecting, in the two-dimensional image of the physical environment, a representation of a first object corresponding to the first semantic label. In various implementations, various object detection algorithms can be applied to the two-dimensional image of the physical environment to detect the representation of the first object in the two-dimensional image of the physical environment.

In various implementations, the device detects the representation of the first object using a neural network. In particular, the device applies a neural network to the two-dimensional image to detect the representation of the first object. Accordingly, in various implementations, detecting the representation of a first object corresponding to the first semantic label includes providing the two-dimensional image to a machine-learning object detector.

In various implementations, the machine-learning object detector is trained on training data including two-dimensional images of the object type indicated by the first semantic label. Thus, when the first semantic label is "table", the device applies a neural network trained on two-dimensional images of tables to detect a representation of a table in the two-dimensional image. When the first semantic label is "picture", the device applies a neural network trained on two-dimensional images of pictures to detect a representation of a picture in the two-dimensional image.

The method 800 continues, in block 840, with the device determining a plurality of sets of two-dimensional coordinates in a two-dimensional coordinate system of the two-dimensional image of the physical environment corresponding to the representation of the first object. Once a representation of the first object is detected in the two-dimensional image, the device determines a plurality of sets of two-dimensional coordinates in the two-dimensional coordinate system of the two-dimensional image that would correspond to points in the point cloud. Whereas the machine-learning object detector may provide a bounding box (in the two-dimensional coordinate system) around a representation of the first object, the electronic device further determines the plurality of sets of two-dimensional coordinates in the two-dimensional coordinate system of edges, corners, or other features of the representation of the first object.

The method 800 continues, in block 850, with the device determining, from the first cluster of points associated with the first semantic label, a plurality of sets of three-dimensional coordinates in the three-dimensional coordinate system of the physical environment respectively corresponding to the plurality of sets of two-dimensional coordinates in the two-dimensional coordinate system of the two-dimensional image of the physical environment. Thus, for each of the plurality of sets of two-dimensional coordinates in the two-dimensional coordinate system representing a respective feature of the first object, the device determines a corresponding set of three-dimensional coordinates in the three-dimensional coordinate system representing the respective feature of the first object.

In various implementations, the first semantic label indicates a rectangular object. For example, the semantic label may be "rectangle", "picture", "television", or "tabletop". In various implementations, determining the first plurality of sets of two-dimensional coordinates includes determining the sets of two-dimensional coordinates of at least two corners of the object and determining the first plurality of sets of three-dimensional coordinates includes determining the sets of three-dimensional coordinates of the at least two corners of the object.

The method 800 continues, in block 860, with the device determining an estimate of the one or more intrinsic parameters of the camera based on the plurality of two-dimensional coordinates and the plurality of three-dimensional coordinates. In various implementations, the device determines the estimate of the one or more intrinsic parameters of the camera using the pinhole camera model equation described above with respect to FIG. 7. In various implementations, the device uses a direct linear transform (DLT) method, Zhang's method, or Tsai's method.

In various implementations, the one or more intrinsic parameters of the camera include at least one of a focal length of the camera, a size or shape (e.g., an aspect ratio) of the camera, or a principal point of the camera.

As noted above, in various implementations, obtaining the point cloud includes obtaining a plurality of images of the physical environment from a plurality of different perspectives and generating the point cloud based on the plurality of images of the physical environment. In various implementations, the two-dimensional image of the physical environment is one of the plurality of images of the physical environment. In various implementations, determining the estimate of the one or more intrinsic parameters of the camera is further based on at least one extrinsic parameter of the camera associated with the two-dimensional image of the physical environment obtained in generating the point cloud.

As noted above, in various implementations, obtaining the point cloud includes obtaining the two-dimensional image of a physical environment, obtaining a depth map of the two-dimensional image of the physical environment, and generating the point cloud based on the two-dimensional image of the physical environment and the depth map. In various implementations, determining the estimate of the one or more intrinsic parameters of the camera is further based on at least one extrinsic parameter of the camera associated with the two-dimensional image of the physical environment obtained in generating the point cloud.

In various implementations, determining the estimate of the one or more intrinsic parameters of the camera is further based on at least one extrinsic parameter of the camera associated with the two-dimensional image of the physical environment obtained from an inertial measurement unit (IMU). For example, an IMU providing a gravity vector also provides at least one extrinsic parameter associated with the rotation matrix, R.

Thus, in various implementations, determining the estimate of the one or more intrinsic parameters of the camera is further based on a known set of one or more or all of the extrinsic parameters of the camera. However, in various implementations, determining the estimate of the one or more intrinsic parameters of the camera is not based on any known extrinsic parameter of the camera. Thus, in various implementations, determining the estimate of the one or more intrinsic parameters of the camera further include determining one or more or all of the extrinsic parameters of the camera.

In various implementations, the point cloud includes multiple semantically labelled clusters that can be used to estimate the one or more intrinsic parameters of the camera. Thus, in various implementations, the plurality of points further includes a second cluster of points associated with a second semantic label. In various implementations, the method 800 includes determining a second plurality of sets of two-dimensional coordinates in the two-dimensional coordinate system of the two-dimensional image of the physical environment corresponding to the representation of the second object. In various implementations, the method 800 includes determining, from the second cluster of points associated with the second semantic label, a second plurality of sets of three-dimensional coordinates in the three-dimensional coordinate system of the physical environment respectively corresponding to the second plurality of sets of two-dimensional coordinates in the two-dimensional coordinate system of the two-dimensional image of the physical environment. In various implementations, determining the estimate of the one or more intrinsic parameters is further based on the second plurality of two-dimensional coordinates and the second plurality of three-dimensional coordinates.

Once the intrinsic parameters of the camera have been estimated, the estimate of the one or more intrinsic parameters of the camera can be used in various ways. In various implementations, the method 800 includes displaying the two-dimensional image of the physical environment with at least one virtual object rendered according to the one or more intrinsic parameters of the camera. In various implementations, the method 800 includes determining a device type of an electronic device including the camera based on the one or more intrinsic parameters. For example, if the device determines that the one or more intrinsic parameters are the same as (or at least substantially similar to) a camera installed on electronic devices of a particular make and model (e.g., a smartphone released in 2007 by a first manufacturer or a tablet released in 2015 by a second manufacturer), the device can further infer various processing, display, and/or other capabilities associated with the particular make and model.

FIG. 9 is a flowchart representation of a method 900 of determining an estimate of a position of a camera in accordance with some implementations. In various implementations, the method 900 is performed by a device with one or more processors and non-transitory memory. In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device obtaining a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label.

In various implementations, obtaining the point cloud includes obtaining a plurality of images of the physical environment from a plurality of different perspectives and generating the point cloud based on the plurality of images of the physical environment. For example, in various implementations, the device detects the same feature in two or more images of the physical environment and using perspective transform geometry, determines the sets of coordinates in the three-dimensional space of the feature. In various implementations, the plurality of images is captured by the same camera at different times (e.g., by the same single scene camera of the device at different times when the device is moved between the times). In various implementations, the plurality of images is captured by different cameras of the device at the same time (e.g., by multiple scene cameras).

In various implementations, obtaining the point cloud includes obtaining an image of a physical environment, obtaining a depth map of the image of the physical environment, and generating the point cloud based on the image of the physical environment and the depth map. In various implementations, the image is captured by a scene camera of the device and the depth map is generated by a depth sensor of the device.

In various implementations, obtaining the point cloud includes using a 3D scanner to generate the point cloud.

In various implementations, each point is associated with additional data. In various implementations, each point is associated with a color. In various implementations, each point is associated with a color-variation indicating how the point changes color over time. As an example, such information may be useful in discriminating between a semantic label of a "picture" or a "television". In various implementations, each point is associated with a confidence indicating a probability that the coordinates in the three-dimensional space of the point is the true location of the corresponding surface of the object in the physical environment.

In various implementations, obtaining the point cloud of the physical environment includes spatially disambiguating portions of the plurality of points into a plurality of clusters including the first cluster of points. Each cluster includes a subset of the plurality of points of the point cloud. In various implementations, particular points of the plurality of points (e.g., those designated as noise) are not included in any of the plurality of clusters.

Various point cloud clustering algorithms can be used to spatially disambiguate the point cloud. In various implementations, spatially disambiguating portions of the plurality of points into the plurality of clusters includes performing plane model segmentation. Accordingly, certain clusters of the plurality of clusters correspond to sets of points of the point cloud that lie in the same plane. In various implementations, spatially disambiguating portions of the plurality of points into the plurality of clusters includes performing Euclidean cluster extraction.

In various implementations, obtaining the point cloud of the physical environment includes determining the first semantic label based on the volumetric arrangement of the points of the first cluster of points. In various implementations, the device determines a semantic label for each of the plurality of clusters.

In various implementations, the device determines the first semantic label by determining a flatness of the first cluster of points. For example, if a bounding box surrounding the first cluster of points has a depth in a dimension that is substantially smaller than its height and width, the cluster is "flat." If the flat cluster is vertical, the device determines a semantic label of "wall". If the flat cluster is horizontal, the device determines a semantic label of "tabletop", but it the cluster is the lowest such horizontal cluster, the device determines a semantic label of "floor".

In various implementations, the device determines the first semantic label with a neural network. In particular, the device applies a neural network to the sets of coordinates in the three-dimensional space of the points of the first cluster to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the particular cluster. In various implementations, the neural network provides, as an output, a semantic label for the cluster.

As noted above, in various implementations, each point is associated with additional data. In various implementations, the additional data is also provided as an input to the neural network. For example, in various implementations, the color or color variation of each point of the cluster is provided to the neural network. In various implementations, the confidence of each point of the cluster is provided to the neural network.

In various implementations, the neural network is trained for a variety of object types. For each object type, training data in the form of point clouds of objects of the object type is provided. More particularly, training data in the form of the sets of coordinates in the three-dimensional space of the points of point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular cluster corresponds to the particular object type in response to receiving the sets of coordinates in the three-dimensional space of the points of the particular cluster. Thus, in response to receiving the sets of coordinates in the three-dimensional of the points of a particular cluster, a neural network detector for tables may output a 0.9, a neural network detector for chairs may output a 0.5, and a neural network detector for cylinders may output a 0.2. The semantic label is determined based on the greatest output.

In various implementations, the device determines multiple semantic labels for the particular cluster. In various implementations, the device determines a series of hierarchical or layered semantic labels for the particular cluster. For example, the device determines a number of semantic labels that identity the object represented by the cluster with increasing degrees of specificity. For example, the device determines a first semantic label of "flat" for the particular cluster indicating that the cluster has one dimension substantially smaller than the other two. The device then determines a second semantic label of "horizontal" indicating that the flat cluster is horizontal, e.g., like a floor or tabletop rather than vertical like a wall or picture. The device then determines a third semantic label of "floor" indicating that that the flat, horizontal cluster is a floor rather than a table or ceiling. The device then determines a fourth semantic label of "carpet" indicating that the floor is carpeted rather than tile or hardwood floor.

In various implementations, the device determines sub-labels associated with sub-clusters of the particular cluster. In various implementations, the method includes spatially disambiguating portions of the particular cluster into a plurality of sub-clusters and determining a semantic sub-label based on the volumetric arrangement of the points of a particular sub-cluster of the plurality of clusters. For example, in various implementations, the device determines a first semantic label of "table" for the particular cluster.

After spatially disambiguating the table cluster include a plurality of sub-clusters, a first semantic sub-label of "tabletop" is determined for a first sub-cluster, whereas a second semantic sub-label of "leg" is determined for a second sub-cluster.

The method 900 continues, in block 920, with the device obtaining a two-dimensional image of the physical environment with a camera associated with a point-of-view set of three-dimensional coordinates in the three-dimensional coordinate system of the physical environment. In various implementations, the two-dimensional image is captured by the camera when the camera is located at the point-of-view set of three-dimensional coordinates in the three-dimensional coordinate system of the physical environment.

The method 900 continues, in block 930, with the device detecting, in the two-dimensional image of the physical environment, a representation of a first object corresponding to the first semantic label. In various implementations, various object detection algorithms can be applied to the two-dimensional image of the physical environment to detect the representation of the first object in the two-dimensional image of the physical environment.

In various implementations, the device detects the representation of the first object using a neural network. In particular, the device applies a neural network to the two-dimensional image to detect the representation of the first object. Accordingly, in various implementations, detecting, the representation of a first object corresponding to the first semantic label includes providing the two-dimensional image to a machine-learning object detector.

In various implementations, the machine-learning object detector is trained on training data including two-dimensional images of the object type indicated by the first semantic label. Thus, when the first semantic label is "table", the device applies a neural network trained on two-dimensional images of tables to detect a representation of a table in the two-dimensional image. When the first semantic label is "picture", the device applies a neural network trained on two-dimensional images of pictures to detect a representation of a picture in the two-dimensional image.

The method 900 continues, in block 940, with the device determining a plurality of sets of two-dimensional coordinates in a two-dimensional coordinate system of the two-dimensional image of the physical environment corresponding to the representation of the first object. Once a representation of the first object is detected in the two-dimensional image, the device determines a plurality of sets of two-dimensional coordinates in the two-dimensional coordinate system of the two-dimensional image that would correspond to points in the point cloud. Whereas the machine-learning object detector may provide a bounding box (in the two-dimensional coordinate system) around a representation of the first object, the electronic device further determines the plurality of sets of two-dimensional coordinates in the two-dimensional coordinate system of edges, corners, or other features of the representation of the first object.

The method 900 continues, in block 950, with the device determining, from the first cluster of points associated with the first cluster of points associated with the first semantic label, a plurality of sets of three-dimensional coordinates in the three-dimensional coordinate system of the physical environment respectively corresponding to the plurality of sets of two-dimensional coordinates in the two-dimensional coordinate system of the two-dimensional image of the physical environment. Thus, for each of the plurality of sets of two-dimensional coordinates in the two-dimensional coordinate system representing a respective feature of the first object, the device determines a corresponding set of three-dimensional coordinates in the three-dimensional coordinate system representing the respective feature of the first object.

In various implementations, the first semantic label indicates a rectangular object. For example, the semantic label may be "rectangle", "picture", "television", or "tabletop". In various implementations, determining the first plurality of sets of two-dimensional coordinates includes determining the sets of two-dimensional coordinates of at least two corners of the object and determining the first plurality of sets of three-dimensional coordinates includes determining the sets of three-dimensional coordinates of the at least two corners of the object.

The method 900 continues, in block 960, with the device determining an estimate of the point-of-view set of three-dimensional coordinates based on the plurality of two-dimensional coordinates and the plurality of three-dimensional coordinates. In various implementations, the device determines the estimate of the point-of-view set of three-dimensional coordinates using the pinhole camera model equation described above with respect to FIG. 7. In various implementations, the device uses a direct linear transform (DLT) method, Zhang's method, or Tsai's method.

In various implementations, determining the estimate of the point-of-view set of three-dimensional coordinates is further based on a known set of one or more or all of the intrinsic parameters of the camera. However, in various implementations, determining the estimate of the point-of-view three-dimensional coordinates is not based on any known intrinsic parameter of the camera. Thus, in various implementations, determining the estimate of the point-of-view set of three-dimensional coordinates further includes determining one or more or all of the intrinsic parameters of the camera.

In various implementations, determining the estimate of the point-of-view set of three-dimensional coordinates is further based on at least one extrinsic parameter of the camera associated with the two-dimensional image of the physical environment obtained from an inertial measurement unit (IMU). For example, an IMU providing a gravity vector also provides at least one extrinsic parameter associated with the rotation matrix, R. In various implementations, the two-dimensional image of the physical environment is further associated with an orientation in the three-dimensional coordinate system of the physical environment and the method 900 further includes determining an estimate of the orientation.

In various implementations, the point cloud includes multiple semantically labelled clusters that can be used to estimate the one or more intrinsic parameters of the camera. Thus, in various implementations, the plurality of points further includes a second cluster of points associated with a second semantic label. In various implementations, the method 900 includes determining a second plurality of sets of two-dimensional coordinates in the two-dimensional coordinate system of the two-dimensional image of the physical environment corresponding to the representation of the second object. In various implementations, the method 900 includes determining, from the second cluster of points associated with the second semantic label, a second plurality of sets of three-dimensional coordinates in the three-dimensional coordinate system of the physical environment respectively corresponding to the second plurality of sets of two-dimensional coordinates in the two-dimensional coordinate system of the two-dimensional image of the physical environment. In various implementations, determining the estimate of the point-of-view set of three-dimensional coordinates is further based on the second plurality of two-dimensional coordinates and the second plurality of three-dimensional coordinates.

Once the point-of-view set of three-dimensional coordinates have been estimated, the estimate of the point-of-view set of three-dimensional coordinates can be used in various ways. In various implementations, the method 900 includes displaying the two-dimensional image of the physical environment with at least one virtual object rendered from the point-of-view set of three-dimensional coordinates. In various implementations, the method 900 includes determining a spatial relationship between the electronic device including the camera (located at the point-of-view set of three-dimensional coordinates) and at least one object in the physical environment. For example, in various implementations, the device determines a distance between the electronic device and the first object. If that distance is less than a threshold, the device performs an action with respect to the first object, such as displaying additional data regarding the first object.

Figure 10:
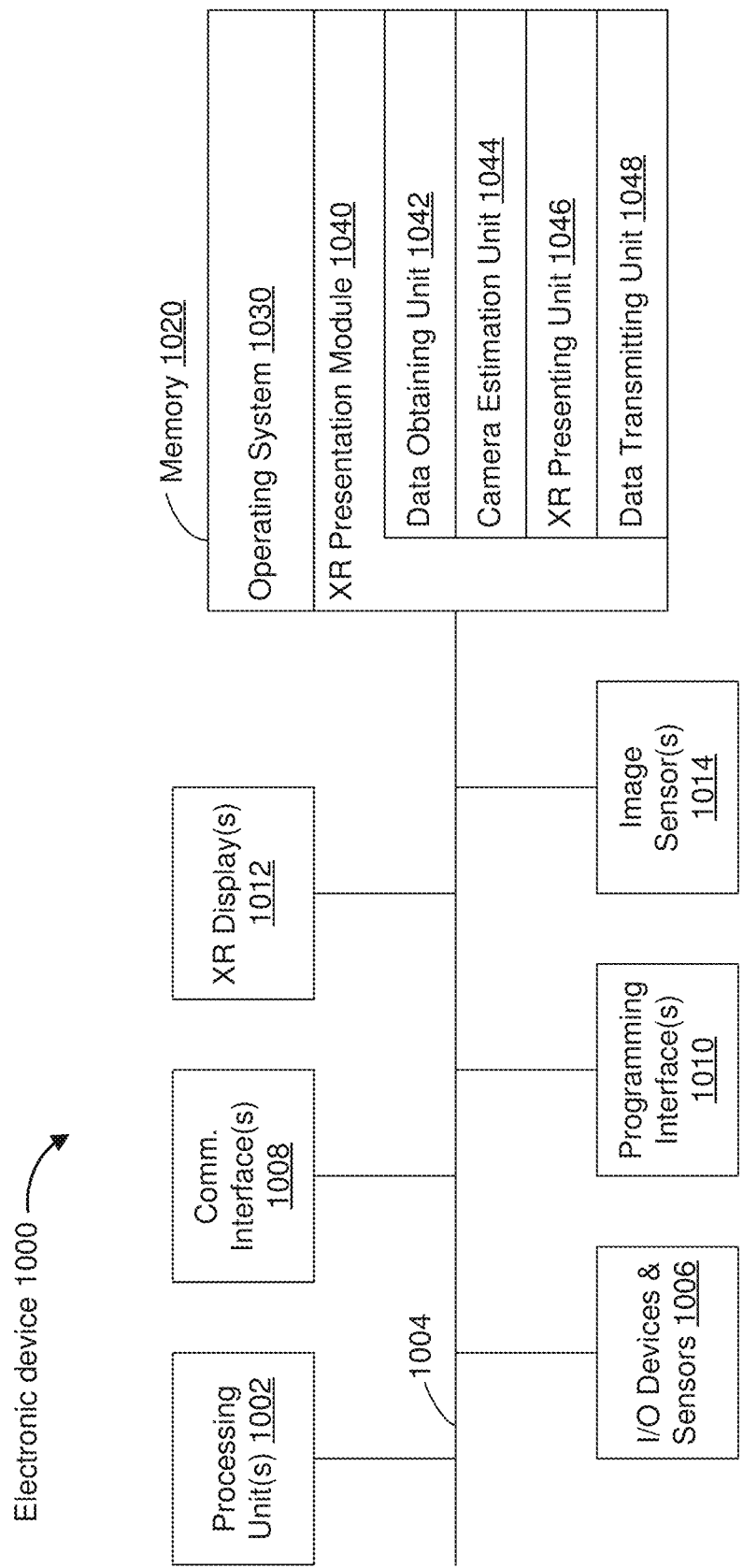
FIG. 10 is a block diagram of an electronic device in accordance with some implementations.

FIG. 10 is a block diagram of an electronic device 1000 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more XR displays 1012, one or more optional interior- and/or exterior-facing image sensors 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1012 are configured to present XR content to the user. In some implementations, the one or more XR displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1012 correspond to diffractive, reflective, polarized, holographic, etc. waveguide displays. For example, the electronic device 1000 includes a single XR display. In another example, the electronic device 1000 includes an XR display for each eye of the user. In some implementations, the one or more XR displays 1012 are capable of presenting AR, MR, and/or VR content.

In various implementations, the one or more XR displays 1012 are video passthrough displays which display at least a portion of a physical environment as an image captured by a scene camera. In various implementations, the one or more XR displays 1012 are optical see-through displays which are at least partially transparent and pass light emitted by or reflected off the physical environment.

In some implementations, the one or more image sensors 1014 are configured to obtain image data that corresponds to at least a portion of the face of the user that includes the eyes of the user (any may be referred to as an eye-tracking camera). In some implementations, the one or more image sensors 1014 are configured to be forward-facing so as to obtain image data that corresponds to the physical environment as would be viewed by the user if the electronic device 1000 was not present (and may be referred to as a scene camera). The one or more optional image sensors 1014 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and an XR presentation module 1040.

The operating system 1030 includes procedures for handling various basic system services and for performing hardware dependent tasks. In some implementations, the XR presentation module 1040 is configured to present XR content to the user via the one or more XR displays 1012. To that end, in various implementations, the XR presentation module 1040 includes a data obtaining unit 1042, a camera estimation unit 1044, an XR presenting unit 1046, and a data transmitting unit 1048.

In some implementations, the data obtaining unit 1042 is configured to obtain data (e.g., presentation data, interaction data, sensor data, location data, etc.). The data may be obtained from the one or more processing units 1002 or another electronic device. For example, in various implementations, the data obtaining unit 1042 obtains a point cloud of a physical environment. To that end, in various implementations, the data obtaining unit 1042 includes instructions and/or logic therefor, and heuristics and metadata therefor.

In some implementations, the camera estimation unit 1044 is configured to determine an estimate of one or more intrinsic and/or extrinsic parameters of at least one of the one or more image sensors 1014. To that end, in various implementations, the camera estimation unit 1044 includes instructions and/or logic therefor, and heuristics and metadata therefor.

In some implementations, the XR presenting unit 1046 is configured to present XR content via the one or more XR displays 1012. To that end, in various implementations, the XR presenting unit 1046 includes instructions and/or logic therefor, and heuristics and metadata therefor.

In some implementations, the data transmitting unit 1048 is configured to transmit data (e.g., presentation data, location data, etc.) to the one or more processing units 1002, the memory 1020, or another electronic device. To that end, in various implementations, the data transmitting unit 1048 includes instructions and/or logic therefor, and heuristics and metadata therefor.

Although the data obtaining unit 1042, the camera estimation unit 1044, the XR presenting unit 1046, and the data transmitting unit 1048 are shown as residing on a single electronic device 1000, it should be understood that in other implementations, any combination of the data obtaining unit 1042, the camera estimation unit 1044, the XR presenting unit 1046, and the data transmitting unit 1048 may be located in separate computing devices.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device including one or more processors and non-transitory memory:

obtaining a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label;

obtaining, via a camera, a two-dimensional image of the physical environment associated with a point-of-view set of three-dimensional coordinates in the three-dimensional coordinate system of the physical environment;

detecting, in the two-dimensional image of the physical environment, a representation of a first object corresponding to the first semantic label;

determining a first plurality of sets of two-dimensional coordinates in a two-dimensional coordinate system of the two-dimensional image of the physical environment corresponding to the representation of the first object;

determining, from the first cluster of points associated with the first semantic label, a first plurality of sets of three-dimensional coordinates in the three-dimensional coordinate system of the physical environment respectively corresponding to the first plurality of sets of two-dimensional coordinates in the two-dimensional coordinate system of the two-dimensional image of the physical environment; and determining a pose of the camera based on an estimate of the point-of-view set of three-dimensional coordinates based on the first plurality of two-dimensional coordinates and the first plurality of three-dimensional coordinates.

2. The method of claim 1, wherein obtaining the point cloud includes:

spatially disambiguating portions of the plurality of points into a plurality of clusters including the first cluster of points; and determining the first semantic label based on a volumetric arrangement of the points of the first cluster of points.

3. The method of claim 2, wherein spatially disambiguating portions of the plurality of points into the plurality of clusters includes performing at least one of plane model segmentation or Euclidean cluster extraction.

4. The method of claim 2, wherein determining the first semantic label includes providing the sets of three-dimensional coordinates of the points of the first cluster to a machine-learning object classifier.

5. The method of claim 1, wherein detecting, in the two-dimensional image of the physical environment, the representation of the first object corresponding to the first semantic label includes providing the two-dimensional image to a machine-learning object detector.

6. The method of claim 1, wherein determining the pose of the camera based on the estimate of the point-of-view set of three-dimensional coordinates is further based on at least one extrinsic parameter of the camera associated with the two-dimensional image of the physical environment obtained from an inertial measurement unit (IMU).

7. The method of claim 1, wherein the two-dimensional image of the physical environment is further associated with an orientation in the three-dimensional coordinate system of the physical environment, the method further comprising determining an estimate of the orientation.

8. The method of claim 1,
wherein the first semantic label indicates a rectangular object,
wherein determining the first plurality of sets of the two-dimensional coordinates includes determining the sets of two-dimensional coordinates of at least two corners of the object, and
wherein determining the first plurality of sets of three-dimensional coordinates includes determining the sets of three-dimensional coordinates of the at least two corners of the object.

9. The method of claim 1, wherein determining the pose of the camera based on the estimate of the point-of-view set of three-dimensional coordinates is based on a pinhole camera model equation.

10. The method of claim 1, wherein the plurality of points further includes a second cluster of points associated with a second semantic label, the method further comprising:
detecting, in the two-dimensional image of the physical environment, a representation of a second object corresponding to the second semantic label;
determining a second plurality of sets of two-dimensional coordinates in the two-dimensional coordinate system of the two-dimensional image of the physical environment corresponding to the representation of the second object; and
determining, from the second cluster of points associated with the second semantic label, a second plurality of sets of three-dimensional coordinates in the three-dimensional coordinate system of the physical environment respectively corresponding to the second plurality of sets of two-dimensional coordinates in the two-dimensional coordinate system of the two-dimensional image of the physical environment,
wherein determining the pose of the camera based on the estimate of the point-of-view set of three-dimensional coordinates is further based on the second plurality of two-dimensional coordinates and the second plurality of three-dimensional coordinates.

11. The method of claim 1, further comprising displaying the two-dimensional image of the physical environment with at least one virtual object rendered from the point-of-view set of three-dimensional coordinates.

12. The method of claim 1, further comprising determining a spatial relationship between the electronic device and at least one object of the physical environment.

13. A device comprising:
a camera;
a non-transitory memory; and
one or more processors to:
obtain a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label;
obtain, via the camera, a two-dimensional image of the physical environment associated with a point-of-view set of three-dimensional coordinates in the three-dimensional coordinate system of the physical environment;
detect, in the two-dimensional image of the physical environment, a representation of a first object corresponding to the first semantic label;
determine a first plurality of sets of two-dimensional coordinates in a two-dimensional coordinate system of the two-dimensional image of the physical environment corresponding to the representation of the first object;
determine, from the first cluster of points associated with the first semantic label, a first plurality of sets of three-dimensional coordinates in the three-dimensional coordinate system of the physical environment respectively corresponding to the first plurality of sets of two-dimensional coordinates in the two-dimensional coordinate system of the two-dimensional image of the physical environment; and
determine a pose of the camera based on an estimate of the point-of-view set of three-dimensional coordinates based on the first plurality of two-dimensional coordinates and the first plurality of three-dimensional coordinates.

14. The device of claim 13, wherein the one or more processors are to determine the estimate of the point-of-view set of three-dimensional coordinates further based on at least one extrinsic parameter of the camera associated with the two-dimensional image of the physical environment obtained from an inertial measurement unit (IMU).

15. The device of claim 13, wherein the two-dimensional image of the physical environment is further associated with an orientation in the three-dimensional coordinate system of the physical environment, wherein the one or more processors are further to determine an estimate of the orientation.

16. The device of claim 13, wherein the one or more processors are to determine the estimate of the point-of-view set of three-dimensional coordinates based on a pinhole camera model equation.

17. The device of claim 13, wherein the plurality of points further includes a second cluster of points associated with a second semantic label, wherein the one or more processors are further to:

detect, in the two-dimensional image of the physical environment, a representation of a second object corresponding to the second semantic label;

determine a second plurality of sets of two-dimensional coordinates in the two-dimensional coordinate system of the two-dimensional image of the physical environment corresponding to the representation of the second object; and determine, from the second cluster of points associated with the second semantic label, a second plurality of sets of three-dimensional coordinates in the three-dimensional coordinate system of the physical environment respectively corresponding to the second plurality of sets of two-dimensional coordinates in the two-dimensional coordinate system of the two-dimensional image of the physical environment, wherein the one or more processors are to determine the estimate of the point-of-view set of three-dimensional coordinates further based on the second plurality of two-dimensional coordinates and the second plurality of three-dimensional coordinates.

18. The device of claim 13, wherein the one or more processors are further to display the two-dimensional image of the physical environment with at least one virtual object rendered from the point-of-view set of three-dimensional coordinates.

19. The device of claim 13, wherein the one or more processors are further to determine a spatial relationship between the electronic device and at least one object of the physical environment.

20. A non-transitory memory storing one or more programs, which, when executed by one or more processors of a device including a camera, cause the device to:

obtain a point cloud of a physical environment including a plurality of points, wherein each of the plurality of points is associated with a set of three-dimensional coordinates in a three-dimensional coordinate system of the physical environment, wherein the plurality of points includes a first cluster of points associated with a first semantic label;

obtain, via a camera, a two-dimensional image of the physical environment associated with a point-of-view set of three-dimensional coordinates in the three-dimensional coordinate system of the physical environment;

detect, in the two-dimensional image of the physical environment, a representation of a first object corresponding to the first semantic label;

determine a first plurality of sets of two-dimensional coordinates in a two-dimensional coordinate system of the two-dimensional image of the physical environment corresponding to the representation of the first object;

determine, from the first cluster of points associated with the first semantic label, a first plurality of sets of three-dimensional coordinates in the three-dimensional coordinate system of the physical environment respectively corresponding to the first plurality of sets of two-dimensional coordinates in the two-dimensional coordinate system of the two-dimensional image of the physical environment; and determine a pose of the camera based on an estimate of the point-of-view set of three-dimensional coordinates based on the first plurality of two-dimensional coordinates and the first plurality of three-dimensional coordinates.

21. The non-transitory memory of claim 20, wherein obtaining the point cloud includes:

spatially disambiguating portions of the plurality of points into a plurality of clusters including the first cluster of points; and determining the first semantic label based on a volumetric arrangement of the points of the first cluster of points.

22. The non-transitory memory of claim 21, wherein spatially disambiguating portions of the plurality of points into the plurality of clusters includes performing at least one of plane model segmentation or Euclidean cluster extraction.

23. The non-transitory memory of claim 20, wherein detecting, in the two-dimensional image of the physical environment, the representation of the first object corresponding to the first semantic label includes providing the two-dimensional image to a machine-learning object detector.

24. The non-transitory memory of claim 20, wherein the first semantic label indicates a rectangular object, wherein determining the first plurality of sets of the two-dimensional coordinates includes determining the sets of two-dimensional coordinates of at least two corners of the object, and wherein determining the first plurality of sets of three-dimensional coordinates includes determining the sets of three-dimensional coordinates of the at least two corners of the object.

\* \* \* \* \*